(12) United States Patent
Yuasa et al.

(10) Patent No.: US 7,873,190 B2
(45) Date of Patent: Jan. 18, 2011

(54) FACE FEATURE POINT DETECTION DEVICE AND METHOD

(75) Inventors: Mayumi Yuasa, Toyko (JP); Tatsuo Kozakaya, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1018 days.

(21) Appl. No.: 11/702,182

(22) Filed: Feb. 5, 2007

(65) Prior Publication Data

US 2007/0201729 A1 Aug. 30, 2007

Related U.S. Application Data

(63) Continuation-in-part of application No. 11/524,270, filed on Sep. 21, 2006.

(30) Foreign Application Priority Data

Feb. 6, 2006 (JP) ............................... 2006-28966
Jan. 9, 2007 (JP) ............................. 2007-001169

(51) Int. Cl.
*G06K 9/00* (2006.01)
(52) U.S. Cl. ...................... 382/118; 382/154
(58) Field of Classification Search ................ 382/118, 382/154, 190, 282
See application file for complete search history.

(56) References Cited

U.S. PATENT DOCUMENTS

| 5,982,912 | A | 11/1999 | Fukui |
| 5,995,639 | A | 11/1999 | Kado et al. |
| 6,580,821 | B1 | 6/2003 | Roy |
| 7,486,825 | B2 | 2/2009 | Yuasa |
| 7,609,859 | B2 | 10/2009 | Lee et al. |
| 7,657,083 | B2 * | 2/2010 | Parr et al. ..................... 382/155 |
| 2006/0269143 | A1 | 11/2006 | Kozakaya |
| 2006/0280342 | A1 * | 12/2006 | Lee et al. ..................... 382/118 |
| 2007/0071289 | A1 | 3/2007 | Takeguchi et al. |
| 2007/0217683 | A1 * | 9/2007 | Kinoshita ..................... 382/190 |

FOREIGN PATENT DOCUMENTS

| JP | 3279913 | 2/2002 |
| JP | 2003-141552 | 5/2003 |

* cited by examiner

*Primary Examiner*—Daniel G Mariam
(74) *Attorney, Agent, or Firm*—Finnegan, Henderson, Farabow, Garrett & Dunner, L.L.P.

(57) ABSTRACT

A face feature point detecting device according to embodiments includes a unit inputting an image containing a face of a person, a unit detecting a feature point set candidate comprising plural kinds of feature points, and a unit calculating an error between each feature point of the projected feature point set candidate and each feature point of the feature point set including plural kinds of feature points of the three-dimensional model information; and a unit selecting a feature point set having consistency from the feature point set candidates on basis of the errors of the feature points or an integral value of the errors.

18 Claims, 6 Drawing Sheets

FACE FEATURE POINT DETECTION DEVICE AND METHOD

CROSS-REFERENCE TO RELATED APPLICATIONS

This application is a continuation-in-part application of application Ser. No. 11/524,270, filed on Sep. 21, 2006. This application is based upon and claims the benefit of priority from the prior Japanese Patent Application No. 2006-28966, filed on Feb. 6, 2006 and the prior Japanese Patent Application No. 2007-1169, filed on Jan. 9, 2007; the entire contents of which are incorporated herein by reference.

TECHNICAL FIELD

The present invention relates to face feature point detecting device and method.

BACKGROUND OF THE INVENTION

Japanese Patent No. 3,279,913 discloses a method of detecting face feature points. According to this method, feature point candidates are detected by a separability filter, and a set of feature points is selected on the basis of an arrangement of feature points when these feature point candidates are combined with one another, and template matching of a partial area of a face is carried out.

The estimation of the feature point arrangement in the above-described related art is carried out two-dimensionally, and thus it has been difficult to deal with variation of a face direction or the like.

BRIEF SUMMARY OF THE INVENTION

According to embodiments of the present invention, a face feature point detecting device comprises: an image input unit configured to input an image containing a face of a person; a feature point set candidate detecting unit configured to detect feature point set candidates each comprising plural kinds of feature points associated with the face, from the inputted image; a model information storage unit configured to store three-dimensional model information having information on kinds and positions of feature point components of plural faces on a three-dimensional model of the face; an error calculating unit configured to project the detected feature point set candidate on the three-dimensional model, and to calculate an error between each feature point of the projected feature point set candidate and each feature point of the detected feature point set that includes plural kinds of feature points of the three-dimensional model information; and a selecting unit configured to select one or more of the feature point set candidates as a feature point set having consistency so that a predetermined condition is satisfied by each of the errors of the feature points of the selected feature point set candidate or by an integral value of the errors for the selected feature point set candidate.

Accordingly, the arrangement of the plural feature points of the face is estimated by consistency with the three-dimensional model information of the face, whereby an inappropriate arrangement can be removed easily.

DETAILED DESCRIPTION OF THE INVENTION

Embodiments according to the present invention will be described hereunder with reference to the accompanying drawings.

First Embodiment

A face feature point detecting device 10 according to a first embodiment of the present invention will be described hereunder with reference to FIGS. 1 to 3.

(1) Construction of Face Feature Point Detecting Device 10

Figure 1:
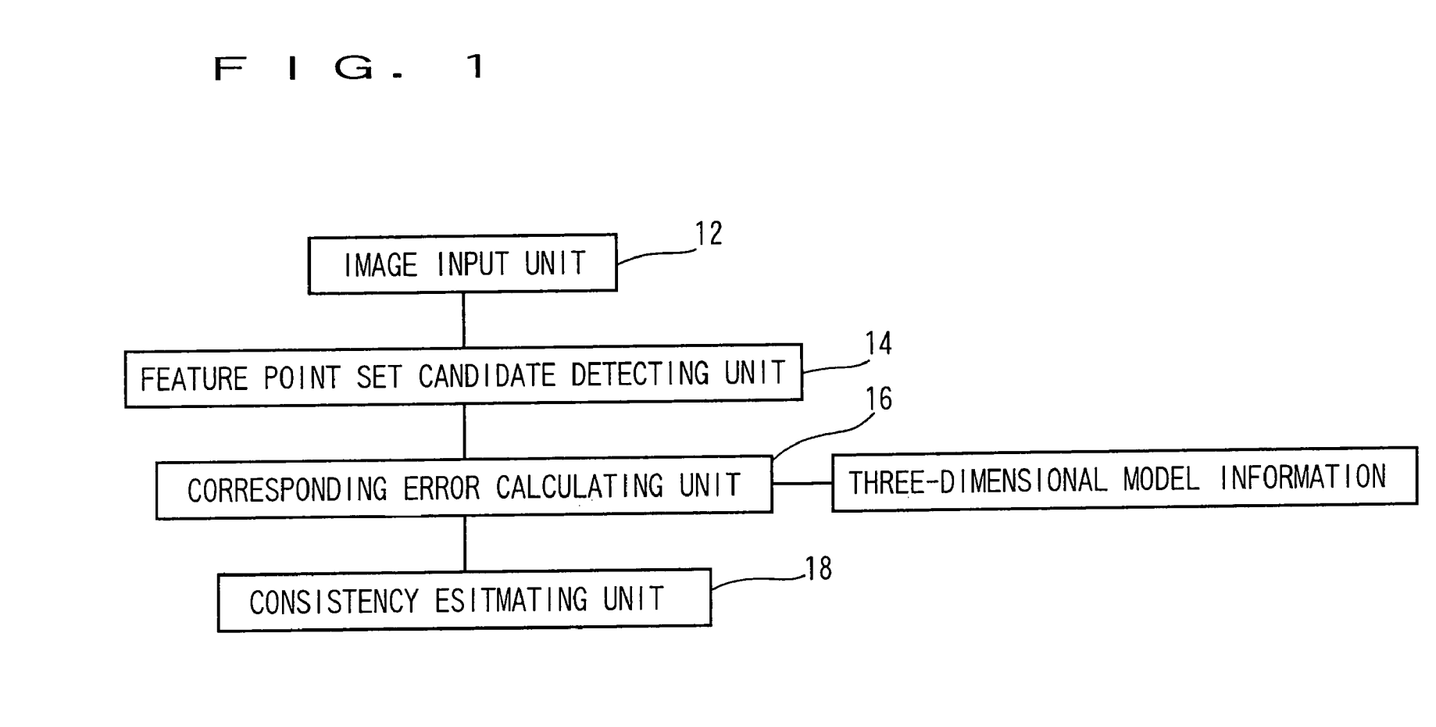
FIG. 1 is a block diagram showing the construction of a face feature point detecting device according to a first embodiment of the present invention.
Figure 2:
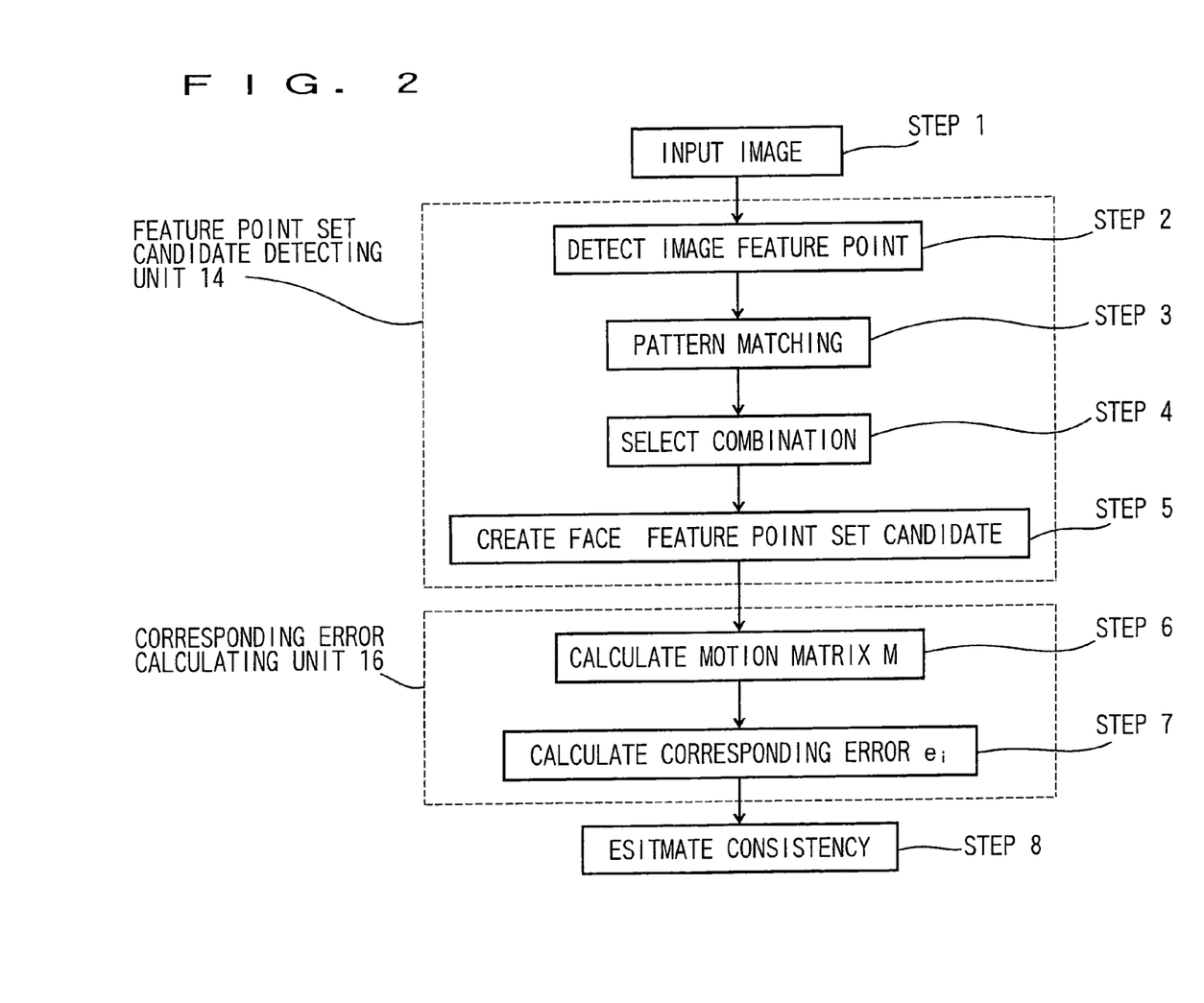
FIG. 2 is a flowchart showing the operation of the first embodiment.

FIG. 1 is a block diagram showing a face feature point detecting device 10 according to an embodiment.

The face feature point detecting device 10 is equipped with an image input unit 12 configured to input an image containing a face area of a person, a feature point set candidate detecting unit 14 configured to detect feature point set candidates comprising plural kinds of feature points, an corresponding error calculating unit 16 configured to calculate corresponding errors from a corresponding feature point set on a three-dimensional shape of the face; and a consistency estimating unit 18 using the errors concerned to select a feature point set.

The functions of the units 12 to 18 are implemented by a program stored in a computer.

(2) Operation of Face Feature Point Detecting Device 10

Next, the operation of the face feature point detecting device 10 will be described with reference to FIGS. 1 and 2. FIG. 2 is a flowchart showing the operation of the face feature point detecting device 10.

(2-1) Step 1

First, the image input unit 12 inputs one image containing a face area of a person from a camera, an image file or the like.

(2-2) Step 2

Next, the feature point set candidate detecting unit 14 detects plural kinds of feature points and also detects a plurality of feature point set candidates each of which comprises a set of these feature points. In this embodiment, there will be a case where feature points of pupils, nostrils and mouth corners are detected two by two, that is, totally six feature points are detected. Here, the totally six feature points may be positionally varied in accordance with the state of an image, a detection error or the like every time they are detected. Therefore, even when the same pupils, nostrils and mouth corners are detected, plural feature point candidates exist for each of these sites. According to this embodiment, a set of feature points most properly located is detected from the plural feature points.

A composite system based on the combination between the image feature point detection using a circular separability filter as disclosed in Japanese Patent No. 3,279,913 and pattern collation is basically used to detect feature point set candidates. First, image feature points are detected by using a circular separability filter as shown in the above publication.

In this embodiment, the method using the circular separability filter is used to the image feature points, however, another method may be used. For example, a corner detecting method may be used.

(2-3) Step 3

Next, pattern matching processing is carried out on each detected image feature point.

In this processing, a local normalized image corresponding to the radius of a separability filter is cropped in the neighborhood of each image feature point, and the similarity between the normalized image and a dictionary which is created from images around pupils, nostrils and mouth corners in advance is calculated. A subspace method is used to calculate the similarity as in the case of the Japanese Patent No. 3,279,913. When the similarity calculated for each image feature point exceeds a predetermined threshold value, the corresponding feature point is selected as a feature point candidate.

(2-4) Step 4

Next, a combination of right and left pupils, right and left nostrils and right and left mouth corners that satisfy predetermined positional conditions is selected. The predetermined positional relationship (condition) means the distance, angle, etc. of a line segment connecting these right and left points.

Furthermore, the similarity to a dictionary which is created from an image normalized with respect to the two points as in the case of the local normalized image is calculated, and it is set as a condition that the similarity exceeds a predetermined threshold value.

(2-5) Step 5

Next, feature point candidates thus selected are combined to create a feature point set candidate. As described above, a plurality of feature point set candidates as described above exist.

(2-6) Step 6

Subsequently, the corresponding error calculating unit 16 calculates the corresponding error between each of the plural detected feature point set candidates and the corresponding feature point set on a three-dimensional shape of the face. The calculation is carried out as follows. However, three-dimensional shape information of a standard face (hereinafter referred to as "three-dimensional model information") is held in advance. It is assumed that the three-dimensional model information contains the position information corresponding to face feature points to be detected (right and left pupils, right and left nostrils, right and left mouth corners).

First, one feature point set candidate is selected from plural feature point set candidates, and the corresponding error of the feature points belonging to the feature point set candidate thus selected is calculated.

A motion matrix M representing the correspondence is calculated from a shape matrix S in which the positions of the feature points on the three-dimensional model information are arranged and an observation matrix W in which the positions of the feature points on an input image are arranged by using a factorization method disclosed in Japanese Application Kokai No. 2003-141552. Here, the position of the feature point means the position of the feature point of each of the right and left pupils, the right and left nostrils and the right and left mouth corners, and the position of the feature point of the observation matrix W corresponds to the position of each feature point of the selected one feature point set candidate.

Accordingly, if the selected one feature point set candidate is varied, the observation matrix W is varied.

The obtained motion matrix M may be regarded as such a projection matrix that the feature point on the three-dimensional model information is projected on the image, the error from the feature point on the image is minimum. The coordinate $(x'_i, y'_i)$ of an i-th feature point obtained by projecting the coordinate $(X_i, Y_i, Z_i)$ of an i-th feature point on the three-dimensional model information onto the image on the basis of the above projection relationship is determined from the motion matrix M according to the following equation (1). The above calculation is carried out on all the face feature points i of each feature point set candidate. However, the coordinate point is based on the center-of-gravity position in advance.

$$(x'_i, y'_i)^T = M(X_i, Y_i, Z_i)^T \quad (1)$$

Figure 3:
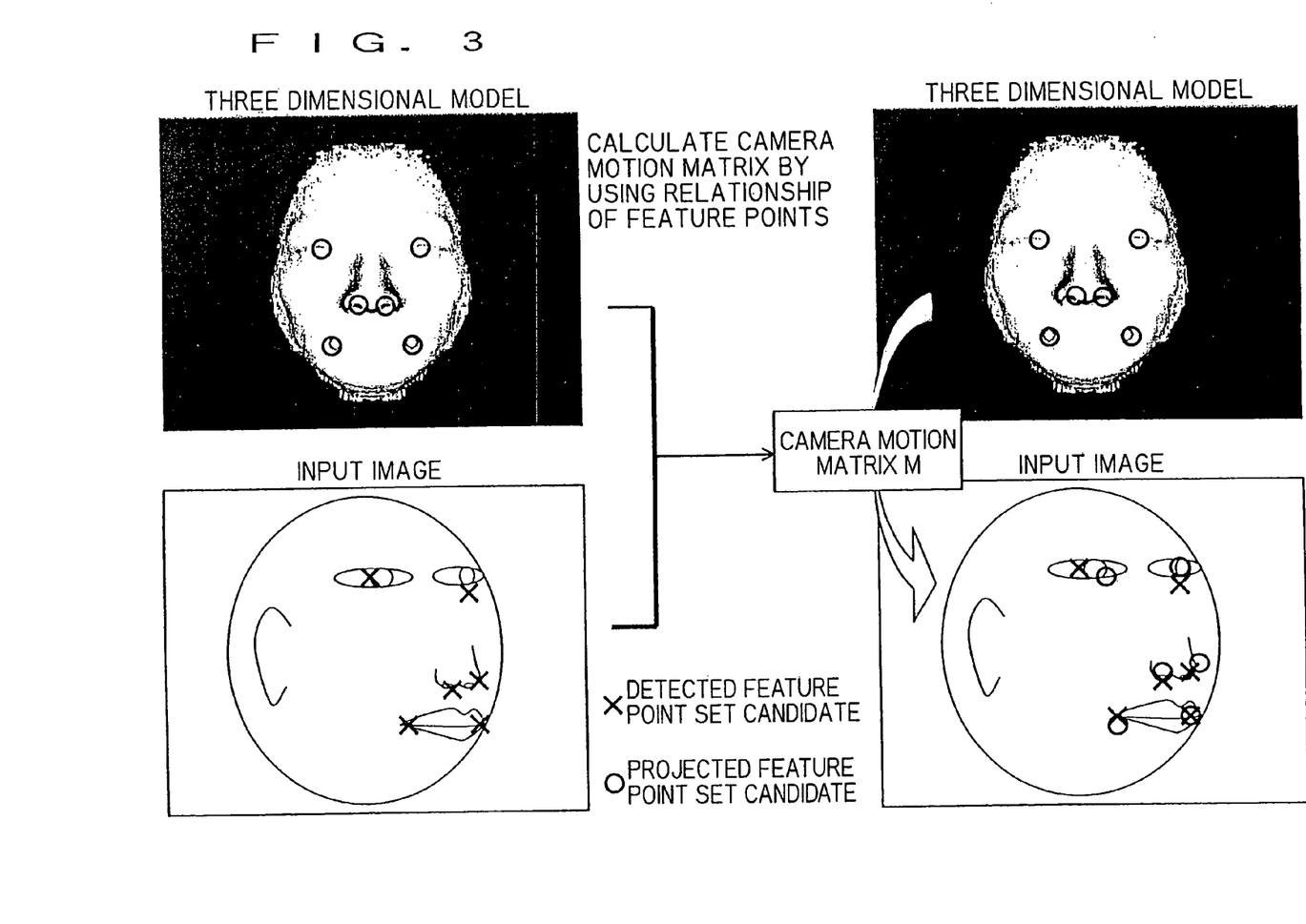
FIG. 3 is a diagram showing projection of feature points on a three-dimensional shape onto an image by a motion matrix.

FIG. 3 shows an illustration that the feature points on the three-dimensional model information are projected by the motion matrix M. Furthermore, the distance di between $(x'_i, y'_i)$ calculated from the equation (1) and the detected face feature point $(x_i, y_i)$ is calculated.

$$di = \{(x'_i - x_i)^2 + (y'_i - y_i)^2\}^{1/2} \quad (2)$$

(2-7) Step 7

The distance di thus calculated is divided by a reference distance d0 obtained from the predetermined relationship of the reference feature point to obtain a corresponding error ei.

$$ei = di/d0 \quad (3)$$

In this case, the reference distance d0 is set to the distance between specific feature points (in this case, both the pupils are set as the specific feature points).

$$d0 = \{(x_{le} - x_{re})^2 + (y_{le} - y_{re})^2\}^{1/2} \quad (4)$$

where, $(x_{le}, y_{le})$, $(x_{re}, y_{re})$ represent the coordinates of the left pupil and the right pupil, respectively. These coordinates are determined for all the feature points i of each feature point set candidate.

(2-8) Step 8

Next, the consistency estimating unit 18 estimates the matching of the arrangement of each feature point set candidate by using the corresponding error ei calculated in the corresponding error calculating unit 16.

The consistency estimation is carried out as follows.

(1) the corresponding errors ei of the feature points i belonging to a feature point set candidate.

(2) The feature point $i_{max}$ providing the maximum error among the corresponding errors ei is determined.

(3) The corresponding error ei of the feature point $i_{max}$ (referred to as $ei_{max}$) is determined.

(4) It is judged whether the maximum corresponding error $ei_{max}$ exceeds a predetermined threshold value.

Then, when the $ei_{max}$ is not more than a predetermined threshold value, it is judged that the feature point set candidate concerned has consistency (i.e., the feature point set candidate concerned is judged as a consistent feature point set). It is experimentally preferable that the predetermined threshold value is set to about 0.2. However, actually, a proper threshold value may be selected in accordance with the type or the like of the feature point to be targeted.

As described above, the consistency judgment is carried out on all the feature point set candidates. If a plurality of feature point set candidates are judged as being consistent, one optimal feature point set candidate is selected from these feature point set candidates. The optimal feature point set candidate is determined as follows. That is, an estimation value $S_{total}$ is calculated from the following equation (5), and the feature point set providing the maximum estimation value $S_{total}$ is selected:

$$S_{total} = S_{sep} + S_{sim} - \alpha_g ei_{max} \quad (5)$$

$S_{sep}$ represents a score of image feature point detection (sum of separability values) obtained in the feature point set candidate detecting unit 14, $S_{sim}$ represents a score in pattern matching (sum of similarity values), and $\alpha_g$ represents a predetermined coefficient.

When plural feature point sets are detected, those that have upper rank estimation values $S_{total}$ may be selected. At this time, if there is any overlap, some means for removing the overlap may be added.

(3) Effect

As described above, according to the face feature point detecting device 10 according to this embodiment, the arrangement of plural feature points is estimated on the basis of the consistency with the three-dimensional model information, whereby an improper arrangement can be simply removed.

Second Embodiment

A face feature point detecting device 10 according to a second embodiment of the present invention will be described with reference to FIGS. 4 and 5.

(1) Construction of Face Feature Point Detecting Device 10

Figure 4:
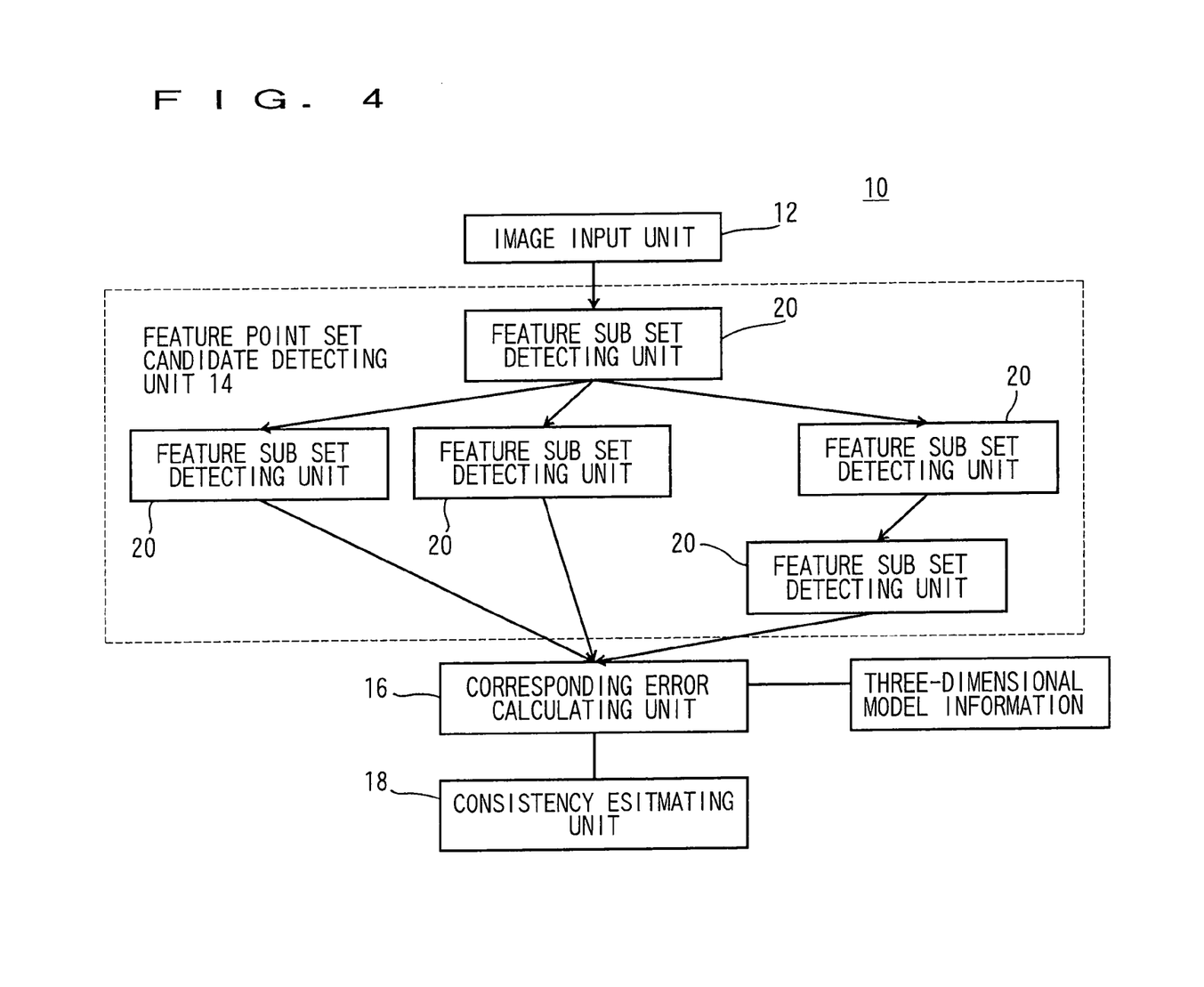
FIG. 4 is a block diagram showing the construction of a face feature point detecting device according to a second embodiment.

FIG. 4 is a block diagram showing the face feature point detecting device 10—according to this embodiment. The basic construction of this embodiment is the same as the first embodiment.

The face feature point detecting device 10 is equipped with an image input unit 12 configured to input an image containing a face area of a person, a feature point set candidate detecting unit 14 configured to detect feature point set candidates each of which comprises plural kinds of feature points, a corresponding error calculating unit 16 configured to calculate corresponding errors from the corresponding feature point set on a three-dimensional shape of the face, and a consistency estimating unit 18 using the corresponding errors for selection of a feature point set.

In this embodiment, the structure of the feature point candidate detecting unit 14 is different from the first embodiment. As shown in FIG. 4, the feature point candidate detecting unit 14 has plural feature sub set detecting units 20 configured to carry out detection processing on a feature point block. The feature point block is associated by a directed graph having unilateral dependence relationship. A feature point block which is not dependent on other feature blocks detects a feature point candidate independently by itself. A feature point block having its dependent feature point block carries out detection by using a detection result of the dependent feature point block concerned.

Here, the feature point block will be further described. For example, when the feature points of the right and left pupils are detected, the feature points are simultaneously detected by a pupil detecting method. The processing of detecting the feature points related to the pupils is set as one feature point block. Accordingly, there exist a feature point block for the right and left nostrils and also a feature point block for the right and left mouth corners. The detection processing in each feature point block is carried out in the feature sub set detecting unit 20 in FIG. 4.

(2) Operation of Face Feature Point Detecting Device 10

Next, the operation of the face feature point detecting device 10 will be described. The image input unit 12, the corresponding error calculating unit 16 and the consistency estimating unit 18 are the same as the first embodiment. In this case, the feature point set candidate detecting unit 14 will be described. The feature point set candidate detecting unit 14 of this embodiment detects the position nose tip in addition to the six feature points detected in the first embodiment, and thus it detects a feature point set comprising totally seven feature points.

Figure 5:
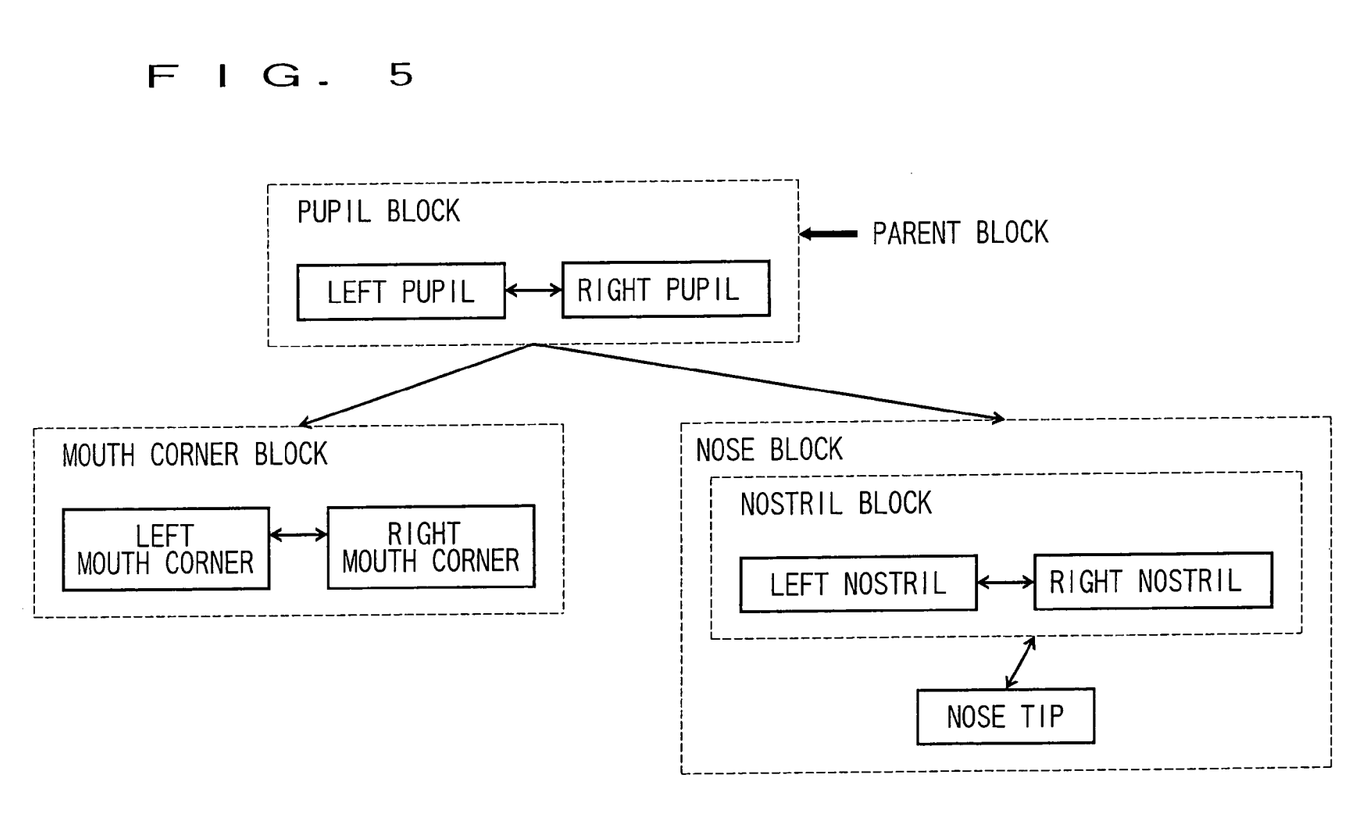
FIG. 5 is a graph showing an example of a feature point graph according to the second embodiment.

A feature point graph as shown in FIG. 5 is pre-designed for feature points to be detected. The dependence relationship of the respective feature points is represented by a directed graph. However, a place where the dependence relationship is cyclic is represented by one feature point block, thereby the place is changed to an acyclic directed graph. Furthermore, the number of feature point blocks which are not dependent on other feature point blocks is set to one. Here, the block which is not dependent on other blocks will be referred to as "parent block". In this case, the dependent relationship is set on the basis of not only the positional proximity, but also a judgment as to whether simultaneous detection is desirable or not, on the basis of the similarity in property of feature points. The block may be set as a nested block.

The respective feature point candidates are detected on the basis of the feature point graph.

(2-1) Detection of Feature Point Set Candidates of Right and Left Pupils

The feature sub set detecting unit 20 detects feature points of right and left pupils corresponding to the parent block. The detection method is the same as the first embodiment, however, the simultaneous detection is solely carried out with paying no attention to the combination with the other feature points such as the nostrils, the mouth corners, etc. However, in order to select a feature point set at the last time, plural feature point set candidates are left.

(2-2) Detection of Feature Point Set Candidates of Mouth Corners

Detection of feature point set candidates in a nose block and a mouth corner block is independently carried out for each of the feature point set candidates of the right and left pupils by each of the feature sub set detecting units 20.

With respect to the detection in the mouth corner block, the feature point set candidates of the right and left mouth corners are detected by the feature sub set detecting unit 20. The detection method is the same as the first embodiment, however, the processing is carried out while a predetermined search range is set to the feature point set candidate of each of the right and left pupils.

Furthermore, it may be judged whether the position of each mouth corner and the relationship thereof are proper or not with respect to the feature point set candidate of the fixed pupil.

Furthermore, when no feature point set candidate is detected for the mouth corners, the average positions of the mouth corners with respect to the predetermined pupil positions are output. The case where the position is determined as described above will be called as "estimated case". In this case, the score of the image feature point detection used in the equation (5) (corresponding to $S_{sep} + S_{sim}$) is absolutely set to be lower than "the detected case".

(2-3) Detection of Feature Point Set Candidate of Nostril

In the nasal block of the nose block, the feature point set candidate of the nostril is likewise detected by the feature sub set detecting unit 20.

(2-4) Detection of Feature Point Candidate of Apex of Nose

Here, the corresponding nose tip is detected for the feature point set candidate of the detected nostril by the feature sub set detector 20. The detection method of the nose tip will be described below.

The nose tip has no clear texture information as compared with the other feature points, and the appearance thereof varies in accordance with the orientation of the face or illumination. Therefore, it is very difficult to detect the nose tip. In this case, it is assumed that the nose tip has higher brightness as compared with the surrounding thereof because of reflection of illumination or the like, and the feature point based on this assumption is detected.

First, the search range is set on the basis of the detected positions of the nostrils.

Secondly, as in the case of the nostrils, the peak of the separability based on the circular separability filter is detected within the search range. However, candidates thus detected contain such a dark portion as detected in the case of the nostril. Therefore, candidates located in the neighborhood of a candidate detected when the nostril is detected are excluded from the detected candidates. When the detection is based on the position of nostrils, improper candidates among these remaining candidates are excluded on the basis of the geometrically positional relationship with the nostril.

Thirdly, the candidate providing the highest separability value is output as the nose tip. When no candidate is detected, the position estimated on the basis of the reference point is output.

(2-4) When no Nostril is Detected

When no feature point set candidate of the nostril is detected in the detection of the nostril at the preceding stage, the position of the nose tip is likewise detected on the basis of the positions of the pupils. Thereafter, the feature point set candidate of the nostril is detected again by using the position of the nose tip. If no feature point set candidate of the nostril is detected, the position estimated from the reference point is output. As described above, even when either nostril or nose tip is not detected in the nose block, they are complemented with each other, whereby they can be detected as a whole.

(3) Effect

As described above, according to the face feature point detecting device 10 of this embodiment, the arrangement of plural feature points is estimated on the basis of the consistency with the three-dimensional model information, whereby an improper arrangement can be simply removed.

Furthermore, by using the feature point graph, the scale and the search range can be narrowed down on the basis of the information of the parent block. In addition no combinatorial explosion occurs. Therefore, as compared with the case where all the combinations are used, the processing can be performed in a practical processing time.

Furthermore, the consistency of the arrangement is finally required. Therefore, when there is an undetected feature point, it can be obtained by estimation, and thus the feature points can be detected at positions which are consistent to some degree as a whole.

(4) Modification

Plural feature set candidates may be detected for the parent block (the feature point set candidate of pupil). In this case, by setting different scores in the equation (5), it is desirable to afterwards reflect the error to the estimation value $S_{total}$.

Third Embodiment

A face feature point detecting device 10 according to a third embodiment of the present invention will be described. The face feature point detected in this embodiment is the same as the first embodiment, and the construction is also the same as the first embodiment. The difference from the first embodiment resides in the portion of the corresponding error calculating unit 16.

Figure 6:
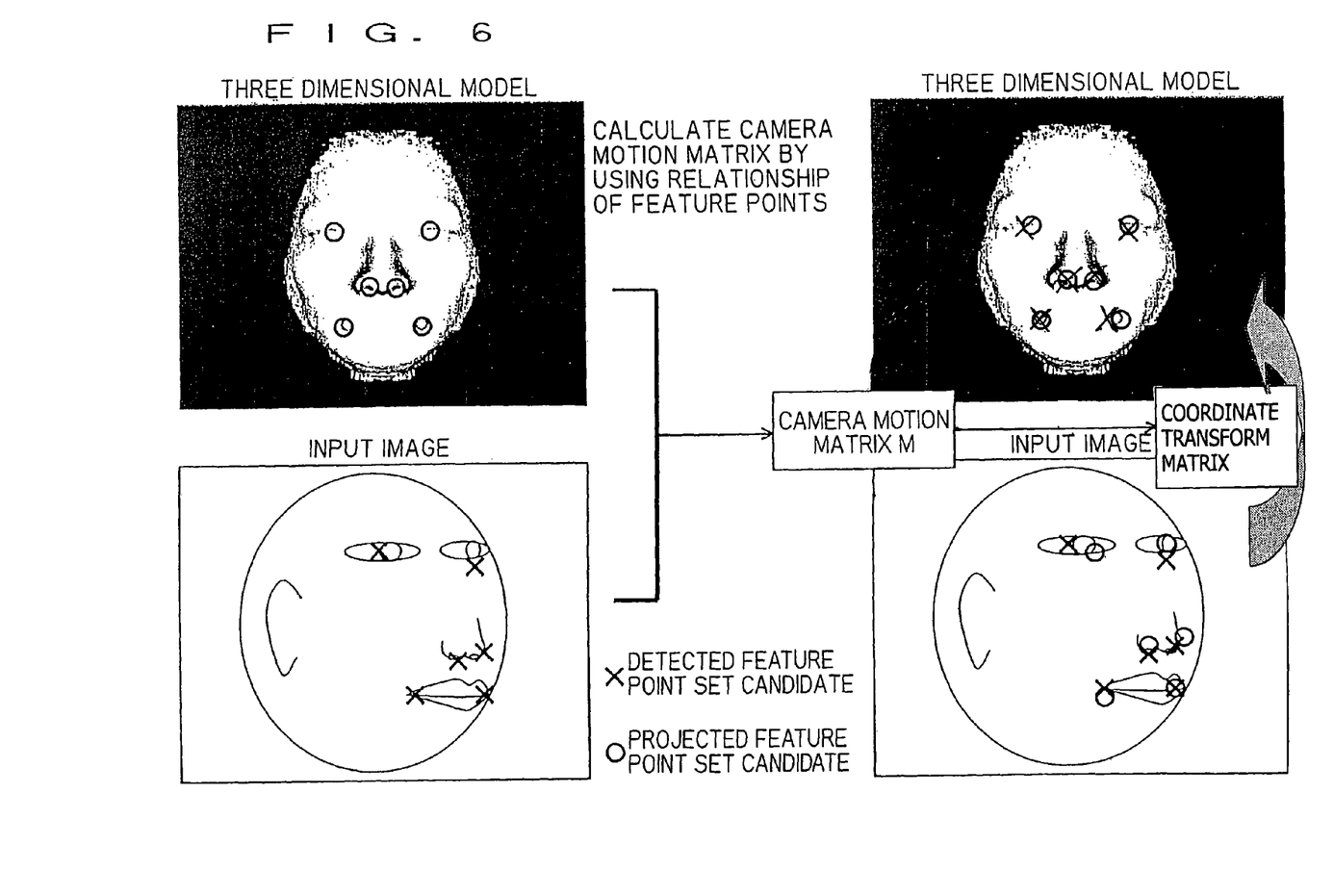
FIG. 6 is a diagram showing an aspect of projecting feature points on an image onto a three-dimensional shape by the conversion associated with a motion matrix.

In the first embodiment, the feature point on the three-dimensional model is projected onto the image of the two-dimensional space by using the equation (1), and the distance between the projected feature point and the detected feature point candidate is calculated in the corresponding error calculating unit 16 to calculate the error. However, according to this embodiment, conversely, the detected feature point candidate of the two-dimensional space is transformed onto the model coordinate of the three-dimensional space. This aspect is shown in FIG. 6.

The coordinate transform corresponds to projecting of points on the two-dimensional coordinate (on an image), to the (X, Y) plane in the three-dimensional model; and in the equation (1), coordinate values (X, Y, Z) are to be calculated from coordinate values (x,y). This is an ill-defined problem because the number of equations is smaller than the number of unknown quantities. However, if it is assumed that the coordinate value "Z" after the transform is equal to the feature points on the three-dimensional model, the coordinate values (X,Y) can be calculated by the equation (6).

$$\begin{bmatrix} X \\ Y \end{bmatrix} = \begin{bmatrix} m_{11} & m_{12} \\ m_{21} & m_{22} \end{bmatrix}^{-1} \begin{bmatrix} x - m_{13}Z \\ y - m_{23}Z \end{bmatrix} \quad (6)$$

Wherein $$M = \begin{bmatrix} m_{11} & m_{12} & m_{13} \\ m_{21} & m_{22} & m_{23} \end{bmatrix} \quad (7)$$

If thus-detected feature point is transformed onto the three-dimensional model to achieve the point (X,Y), the corresponding error can be calculated as in the case of the first embodiment by calculating the distance from the position of the feature point on the three-dimensional model. In place of the normalization based on the pupil distance in the first embodiment, the normalization is carried out by the pupil distance in the three-dimensional model space. In the case of the same model, the pupil distance is constant, and thus calculation is not required to be made each time.

Furthermore, by the transform onto the three-dimensional model, the measurement space is normalized. Therefore, the maximum value is calculated by separately measuring the distances in the X,Y coordinates; the normalization can be adjusted in accordance with the variance of the error which is different for every feature point; and the integration of the errors can be performed. For example, the square root of the sum of squares of the respective distances is set as the overall error. Therefore, the feature point set having the consistency can be selected on the basis of the integrated value of the respective errors.

(Modification)

The present invention is not limited to the embodiment itself, and at the implementing stage the constituent elements may be modified and implemented without departing from the subject matter of the present invention. Furthermore, various kinds of embodiments may be formed by properly combining the plural constituent elements disclosed in the above embodiment. For example, some constituent elements may be deleted from all the constituent elements shown in the embodiments. Furthermore, the constituent elements over the different embodiments may be properly combined with one another.

(1) Modification 1

In the above-described embodiments, the maximum value of the corresponding error is used for the consistency estimation, however, the present invention is not limited to this embodiment. For example, an average value of an error may be used.

(2) Modification 2

Of a plurality of feature points, feature points having low reliability or feature points from which errors are liable to be derived when a three-dimensional shape of a standard face is used because there are great differences between individuals may be out of the estimation.

(3) Modification 3

In the first embodiment, a feature point set comprising six kinds of feature points is detected, and in the second embodiment, a feature point set comprising seven kinds of feature points is detected. However, the kind of feature points is not limited to these kinds. Any feature point may be used insofar as it can be defined in the face area of the person. For example, inner and outer corners of eyes, eyebrow corners, the center point of the mouth, etc. may be used in place of the sites used in the above-described embodiments.

(4) Modification 4

Since the feature point set candidates detected by the above-described embodiments put weight on the balance of the overall position, the precision concerning the individual feature point position may be deteriorated by other feature points. However, higher-precision detecting processing may be carried out as post-processing by using the detected feature point set as an initial value.

According to the above-described embodiments, the feature points of the face can be detected at remarkably near positions, so that the initial value dependence is great and the processing having repetitive process is also effective.

(5) Modification 5

The consistency estimating unit 18 of the-above embodiments carries out only the general estimation. In place of this, for example when a smaller number of feature points (for example, one feature point) has a high error in the detected feature point set candidate, only the feature point may be replaced by another point of the plural feature point set candidates or a point in the estimated case. In a case where the error is within a predetermined range, the replacement processing as described above may be carried out. Furthermore, for a feature point having a large error, the position may be sequentially moved so that the error is reduced. For example, the position may be moved so as to approach to the projected feature point position.

(6) Modification 6

The distance between the pupils is used as the reference distance in the above-described embodiment, however, the present invention is not limited to this embodiment. For example, any factor may be used insofar as it represents the size of the face.

(7) Modification 7

In the above-described embodiments, the three-dimensional shape of a single standard face. However, plural kinds of faces may be used. When plural kinds of faces are used, a method of selecting the face having the smallest error from the faces may be used.

(8) Modification 8

In the above-described embodiments, the face feature point detection is directly carried out from the input image in the image input unit. However, by adding the face area detection to the preceding stage, only the area concerned may be set as a target area in the face feature point detection. Furthermore, plural face areas may be detected and subjected to the face feature point detection.

What is claimed is:

1. A face feature point detecting device comprising:
   an image input unit configured to input an image containing a face of a person;
   a feature point set candidate detecting unit configured to detect feature point set candidates each comprising plural kinds of feature points associated with the face, from the inputted image;
   a model information storage unit configured to store three-dimensional model information having information on kinds and positions of feature point components of plural faces on a three-dimensional model of the face;
   an error calculating unit configured to project the detected feature point set candidate on the three-dimensional model, and to calculate an error between each feature point of the projected feature point set candidate and each feature point of the feature point set including plural kinds of feature points of the three-dimensional model information; and
   a selecting unit configured to select one or more of the feature point set candidates as a feature point set having consistency so that a predetermined condition is satisfied by each of the errors of the feature points of the selected feature point set candidate or by an integral value of the errors for the selected feature point set candidate.

2. The device according to claim 1, wherein the error calculating unit determines a projection matrix for projecting the feature point set of the three-dimensional model information to the two-dimensional space by using the feature point set candidates and the feature point sets of the three-dimensional model information; and transforms the feature point set to that in coordinate on the three-dimensional model by using the projection matrix.

3. The device according to claim 2, wherein the calculating unit calculates a distance between the position of the transformed feature point set candidate and the position of the feature point set on the three-dimensional model and calculates the error by using the distance.

4. The device according to claim 3, wherein the calculating unit normalizes the distance by a pupil distance in the three-dimensional model space and calculates the error by using the normalized distance.

5. The device according to claim 1, wherein the selecting unit calculates a maximum error in the errors of the respective feature points belonging to the feature point set candidate, and selects the one or more feature point set candidate that has the maximum error smaller than a threshold value, as a feature point set having consistency.

6. The device according to claim 1, wherein the feature point set candidate detecting unit comprises plural feature point detectors each detecting the each kind of the feature points, the plural feature point detectors are linked with one another through unilaterally dependent relationships as indicated by a directed-lines diagram, a parent detector independent from the other feature point detectors in the plural feature point detectors independently detects the kind of the feature points from the image, and the feature point detector dependent on the parent detector detects the kind of the feature points by using the image and information of the feature point detected by the parent detector.

7. A face feature point detecting method, performed using a processor or a computer, the method comprising:
   inputting an image containing a face of a person;
   detecting feature point set candidates each comprising plural kinds of feature points on the face, from the image;
   storing three-dimensional model information having information on the kinds and positions of the feature point components of plural faces on the three-dimensional model of the face;
   projecting the detected feature point set candidates onto the three-dimensional model, and calculating errors between each feature point of the projected feature point set candidate and each feature point of the feature point set that includes plural kinds of feature points of the three-dimensional model information; and
   selecting one or more of the feature point set candidates as a feature point set having consistency so that a predetermined condition is satisfied by each of the errors of the feature points of the selected feature point set candidate or by the integral value of the errors for the selected feature point set candidate.

8. The method according to claim 7, said calculating of the error comprising:
   determining a projection matrix for projecting feature point set in the three-dimensional model information to a two-dimensional space by using the feature point set candidate and the feature point set in the three-dimensional model information; and
   transforming the feature point set to that in coordinate on the three-dimensional model by using the projection matrix.

9. The method according to claim 8, further comprising:
   calculating a distance between the position of the transformed feature point set candidate and the position of the feature point set on the three-dimensional model; and
   calculating the error by using the distance.

10. The method according to claim 9, further comprising:
    normalizing the distance by a pupil distance in the three-dimensional model space; and
    calculating the error by using the normalized distance.

11. The method according to claim 7, said selecting of the feature point set having consistency comprising:
    determining a maximum error out of the errors of the respective feature points belonging to the feature point set candidate; and
    selecting the feature point candidate having the maximum error smaller than a threshold value, as the feature point set having consistency.

12. The method according to claim 7, wherein said detecting the one or more feature point set candidate comprises:
    detecting the each kind of the feature points in an order indicated by a directed-lines diagram of unilaterally dependent relationships among the plural kinds of the feature points;
    detecting a parent kind of the feature points independent from the other kinds of the feature points from the image; and
    detecting the kind of the feature points dependent on the parent kind of the feature points by using the image and information of the parent kind of the feature points.

13. A face feature point detecting program stored in a non-transitory computer-readable medium, the program comprising the instructions of:
    inputting an image containing a face of a person;
    detecting feature point set candidates each comprising plural kinds of feature points associated with a face from the image concerned;
    storing three-dimensional model information having information on kinds and position of feature point components of plural faces on a three-dimensional model of the face;
    projecting the detected feature point set candidate on the three-dimensional model, and calculating the error between each feature point of the projected feature point set candidate and each feature point of the detected feature point set that includes plural kinds of feature points of the three-dimensional model information; and
    selecting one or more of the feature point set candidates as a feature point set having consistency, from the feature point set candidates, so that a predetermined condition is satisfied by each of the errors of the feature points of the selected feature point set candidate or by the integral value of the errors for the selected feature point set candidate.

14. The program according to claim 13, wherein said calculating of the error comprises:
    determining a projection matrix for projecting a feature point set of the three-dimensional model information to the two-dimensional space by using the feature point set candidates and the feature point sets of the three-dimensional model information; and
    transforming the feature point set to that in the coordinate on the three-dimensional model by using the projection matrix.

15. The program according to claim 14, wherein said calculating of the error comprises:
    calculating a distance between the position of the transformed feature point set candidate and the position of the feature point set on the three-dimensional model; and
    calculating the error by using the distance.

16. The program according to claim 15, wherein said calculating of the error further comprises:
    normalizing the distance by a pupil distance in the three-dimensional model space; and
    calculating the error by using the normalized distance.

17. The program according to claim 13, wherein said selecting the one or more feature point set candidate comprises:
    determining a maximum error out of the errors of the respective feature points belonging to the feature point set candidate; and
    selecting the one or more feature point set candidate having the maximum error smaller than a threshold value, as a feature point set having consistency.

18. The program according to claim 13, wherein said selecting of the one or more feature point set candidate comprises:
    detecting the each kind of the feature points in an order indicated by a directed-lines diagram of unilaterally dependent relationships among the plural kinds of the future points;

detecting a parent kind of the feature points independent from the other kinds of the feature points from the image; and detecting the kind of the feature points dependent on the parent kind of the feature points by using the image and information of the parent kind of the feature points.

* * * * *